United States Patent
Mizuno

(10) Patent No.: US 6,463,183 B2
(45) Date of Patent: Oct. 8, 2002

(54) IMAGE DATA PROCESSING METHOD AND APPARATUS AND STORAGE MEDIUM

(75) Inventor: Joe Mizuno, Inagi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/736,358

(22) Filed: Dec. 15, 2000

(65) Prior Publication Data

US 2001/0001020 A1 May 10, 2001

Related U.S. Application Data

(63) Continuation of application No. PCT/JP99/01272, filed on Mar. 16, 1999.

(30) Foreign Application Priority Data

Jul. 3, 1998 (JP) .......................................... 10-189434

(51) Int. Cl.⁷ ................................................ G06K 9/20
(52) U.S. Cl. ........................ 382/282; 382/228; 358/538
(58) Field of Search ................................ 382/282, 284, 382/228, 224, 225, 199, 305; 348/77, 155, 157; 707/4, 104; 358/538

(56) References Cited

U.S. PATENT DOCUMENTS 5,878,165 A * 3/1999 Ono ........................... 382/199

FOREIGN PATENT DOCUMENTS

| JP | 3-186978 | 8/1991 |
| JP | 3-271984 | 12/1991 |
| JP | 6-233315 | 8/1994 |
| JP | 7-288679 | 10/1995 |

OTHER PUBLICATIONS

Utsumi et al, "Image Segmentation for Human Tracking using Sequential–image–based Hierarchical Adaptation", Computer Vision and Pattern Recognition, IEEE 1998.*

Utsumi, Akira, "Target Region Segmentation Using Local Pixel Value", vol. 96, No. 86, Sep. 12, 1996, pp. 17–24.

* cited by examiner

Primary Examiner—Yon J. Couso
(74) Attorney, Agent, or Firm—Staas & Halsey LLP

(57) ABSTRACT

An image data processing method is constructed to include a step of storing an image data which includes a first image data related to a first object and a second image data related to a background or a second object which is different from the first object, a step of storing distribution information which indicates a probability of each pixel data being included in the first image data, with respect to at least one portion of the first image data, and a step of adding the distribution information when extracting the first image data from the image data.

27 Claims, 10 Drawing Sheets

IMAGE DATA PROCESSING METHOD AND APPARATUS AND STORAGE MEDIUM

This application is a continuing application, filed under 35 U.S.C. §111(a), of International Application PCT/JP99/01272, filed Mar. 16, 1999, it being further noted that priority is based upon Japanese Patent Application 10-189434, filed Jul. 3, 1998.

TECHNICAL FIELD

The present invention generally relates to image data processing methods and apparatuses and storage media, and more particularly to an image data processing method and apparatus which are suited for extracting an object having a vague boundary from an image, and to a computer-readable storage medium which stores a program for causing a computer to carry out an image data processing using such an image data processing method.

BACKGROUND ART

In multi-media systems and the like, a process is often carried out to extract an arbitrary object within an image. For example, the extracted object is combined with another image to generate a new image. As methods of extracting the object within the image, there is a first method which extracts an image portion which has a predetermined shape and includes the object, such as a circular shape and a rectangular shape, and a second method which generates boundary line information of the object and extracts the object based on the boundary line information. According to the first method, a portion other than the object is also extracted together with the object, and this method is unsuited for a process which extracts the object and combines the extracted object with a background image or the like, because the combined image will appear unnatural. On the other hand, only the object is extracted according to the second method, and this method is therefore suited for the process which extracts the object and combines the extracted object with the background image or the like to obtain the combined image.

However, in the case of an object within a still image, the boundary of the object may not always be clear, depending on the shutter speed and focus used at the time of the image pickup, motion of the camera and the object, the state of the background and the like. In addition, in the case of an object within a moving image, the region of the object may have an inconsistent shape among the frames, and the boundary of t he object may not always be clear, depending on the shutter speed and focus used at the time of the image pickup, motion of the camera and the object, the state of the background and the like.

FIG. 1 is a diagram showing an example of an object having a boundary which is unclear. In FIG. 1, a boundary of a racket 402 held by a tennis player 401 is unclear. In this example shown in FIG. 1, because the racket 402 moves at a high speed, it is vague whether a region 403: is the racket 402, the tennis player 401 or the background.

When extracting the object having the unclear boundary according to the conventional method, the boundary is suitably defined to extract the object from the image regardless of whether the boundary of the object such as the racket 402 is unclear. For this reason, when the object extracted in this manner is combined with the background or the like, there was a problem in that the combined image becomes unnatural due to the conspicuous boundary. In other words, when only a portion which is regarded as the racket 402 and excludes the region 403 is extracted, the motion of the racket 402 is lost. On the other hand, when a portion which is regarded as the racket 402 and includes the region 403 is extracted, the region 403 does not fit into the background of the combined image, to thereby make the combined image look unnatural.

In order to prevent the boundary of the extracted object from becoming conspicuous, it is conceivable to carry out a gradation process with respect to the boundary portion. However, the gradation process will also be carried out with respect to a boundary portion which is originally clear, and there is a problem in that the picture quality of the combined image which is generated by combining the object with the background or the like will deteriorate.

DISCLOSURE OF THE INVENTION

Accordingly, it is a general object of the present invention to provide a novel and useful image data processing method and apparatus and storage medium, in which the problems described above are eliminated.

Another and more specific object of the present invention is to provide an image data processing method and apparatus and storage medium, which can satisfactorily extract an object from an image even if a boundary portion of the object is unclear within the image, and can combine the extracted object with another image to obtain a combined image without deteriorating the picture quality.

Still another object of the present invention is to provide an image data processing method comprising a step of storing an image data which includes a first image data related to a first object and a second image data related to a background or a second object which is different from the first object, a step of storing distribution information which indicates a probability of each pixel data being included in the first image data, with respect to at least one portion of the first image data, and a step of adding the distribution information when extracting the first image data from the image data. According to the image data processing method of the present invention, it is possible to satisfactorily extract the object from the image even if the boundary portion of the object within the image is vague.

The at least one portion of the first image data may include a boundary region of the first object.

The image data processing method may further comprise a step of combining the first image data which is extracted from the image data and is added with the distribution information and a third image data which is related to an arbitrary image, by carrying out a semitransparent process with respect to the at least one portion of the first image data based on the distribution information. In this case, it is also possible to combine the extracted image and another image without deteriorating the picture quality of the combined image.

The image data may be related to a moving image.

A further object of the present invention is to provide an image data processing apparatus comprising a first storage storing an image data which includes a first image data related to a first object and a second image data related to a background or a second object which is different from the first object, a second storage storing distribution information which indicates a probability of each pixel data being included in the first image data, with respect to at least one portion of the first image data, and distribution information adding means for adding the distribution information when extracting the first image data from the image data. According to the image data processing apparatus of the present invention, it is possible to satisfactorily extract the object from the image even if the boundary portion of the object within the image is vague.

The at least one portion of the first image data may include a boundary region of the first object.

The image data processing apparatus may further comprise a combining part combining the first image data which is extracted from the image data and is added with the distribution information and a third image data which is related to an arbitrary image, by carrying out a semitransparent process with respect to the at least one portion of the first image data based on the distribution information. In this case, it is also possible to combine the extracted image and another image without deteriorating the picture quality of the combined image.

The image data may be related to a moving image.

Another object of the present invention is to provide a computer-readable storage medium which stores a program for causing a computer to extract a portion of an image, comprising means for causing the computer to store an image data which includes a first image data related to a first object and a second image data related to a background or a second object which is different from the first object, means for causing the computer to store distribution information which indicates a probability of each pixel data being included in the first image data, with respect to at least one portion of the first image data, and means for causing the computer to add the distribution information when extracting the first image data from the image data. According to the computer-readable storage medium of the present invention, it is possible to satisfactorily extract the object from the image even if the boundary portion of the object within the image is vague.

The at least one portion of the first image data may include a boundary region of the first object.

The computer-readable storage medium may further comprise means for causing the computer to combine the first image data which is extracted from the image data and is added with the distribution information and a third image data which is related to an arbitrary image, by carrying out a semitransparent process with respect to the at least one portion of the first image data based on the distribution information. In this case, it is also possible to combine the extracted image and another image without deteriorating the picture quality of the combined image.

The image data may be related to a moving image.

Therefore, according to the present invention, it is possible to satisfactorily extract the object from the image even if the boundary portion of the object within the image is vague, and it is also possible to combine the extracted object with another image without deteriorating the picture quality of the combined image.

Other objects and further features of the present invention will be apparent from the following detailed description when read in conjunction with the accompanying drawings.

BEST MODE OF CARRYING OUT THE INVENTION

A description will be given of an embodiment of the present invention, by referring to FIGS. 2 through 12.

Figure 1:
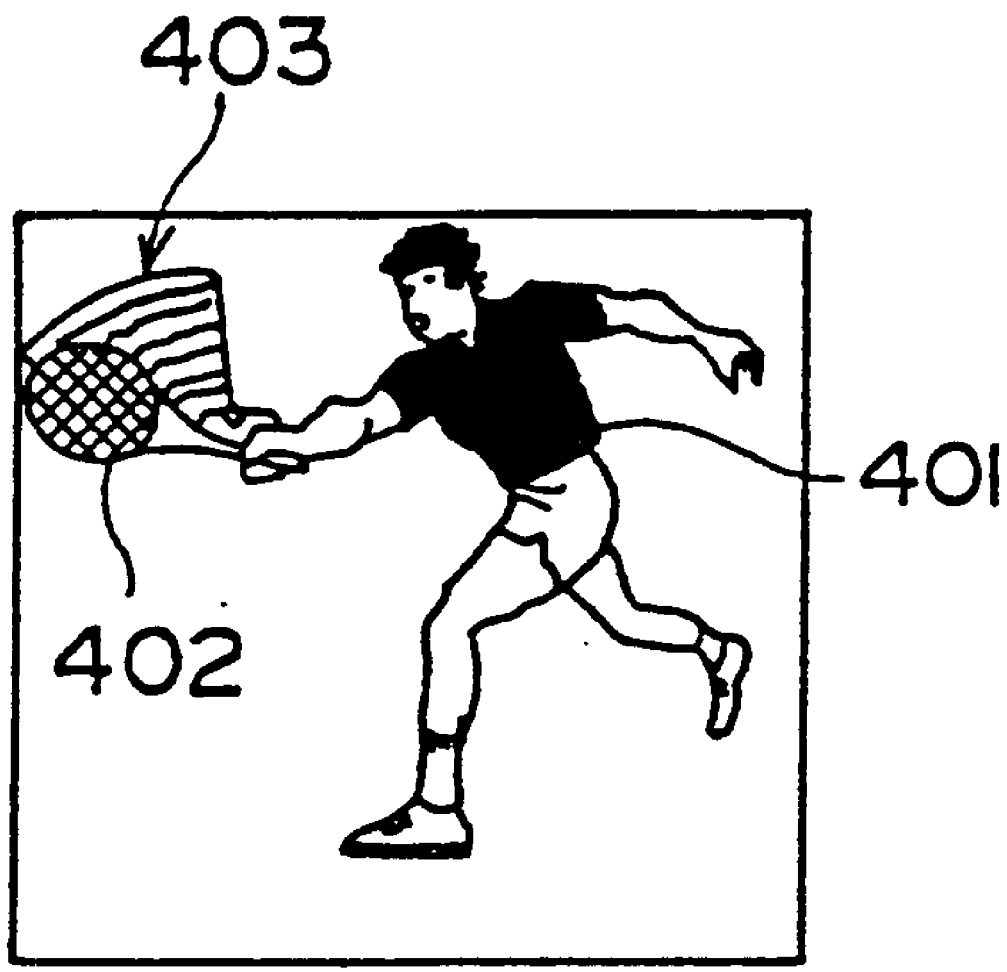
FIG. 1 is a diagram showing an example of an object having a boundary which is unclear.
Figure 2:
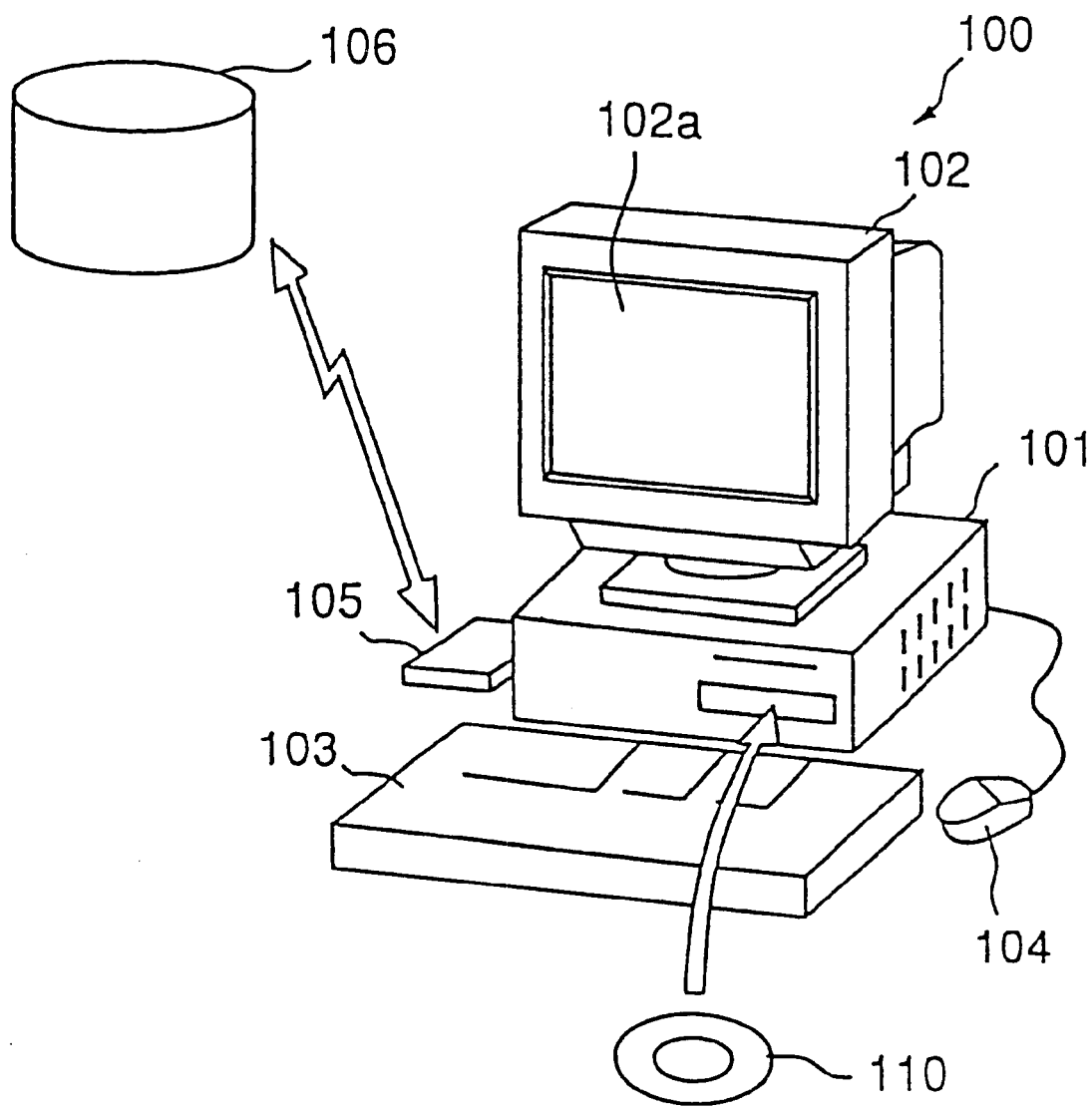
FIG. 2 is a perspective view showing an embodiment of an image data processing apparatus according to the present invention.

FIG. 2 is a perspective view showing an embodiment of an image data processing apparatus according to the present invention. This embodiment of the image data processing apparatus employs an embodiment of an image data processing method according to the present invention. In this embodiment, the image data processing apparatus is formed by a general computer, system such as a personal computer.

A computer system 100 shown in FIG. 2 includes a main body 101 which includes a CPU, a disk drive and the like, a display 102 which includes a display screen 102 for displaying an image in response to an instruction from the main body 101, a keyboard 103 which is used to input various information to the computer system 100, a mouse 104 which is used to specify an arbitrary position on the display screen 102 of the display 102, and a modem 105 which is used to make access to an external database or the like and to download a program or the like stored in another computer system. A program which is stored in a portable recording medium such as a disk 110 or, downloaded from a recording medium 106 of another computer system using a communication unit such as the modem 105, is input to the computer system 100 and compiled therein. This program includes a program which causes the CPU of the computer system 100 to process image data according to this embodiment of the image data processing method.

An embodiment of a computer-readable storage medium according to the present invention is formed by a recording medium such as the disk 110 which stores the program described above. The recording medium is not limited to a removable recording medium such as IC card memories, floppy disks, magneto-optical disks, CD-ROMs and various kinds of semiconductor memory devices, and also includes recording media which are accessible by a computer system which is connected via a communication means or a communication unit such as the modem and LAN.

Figure 3:
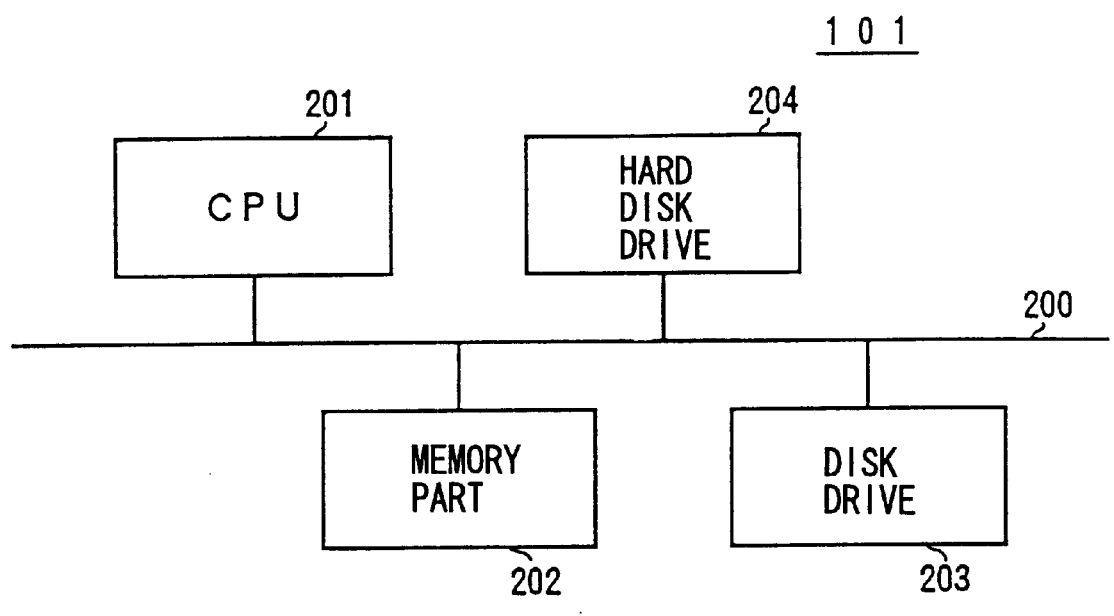
FIG. 3 is a system block diagram showing the construction of an important part within a main body of a computer system shown in FIG. 2.

FIG. 3 is a system block diagram showing the construction of an important part within the main body 101 of the computer system 100. In FIG. 3, the main body 101 generally includes a CPU 201, a memory part 202 made up of a RAM, ROM or the like, a disk drive 203 for the disk 110, and a hard disk drive 204 which are connected via a bus 200.

The construction of the computer system 100 is of course not limited to that shown in FIGS. 2 and 3, and various other known constructions may be employed instead.

Figure 4:
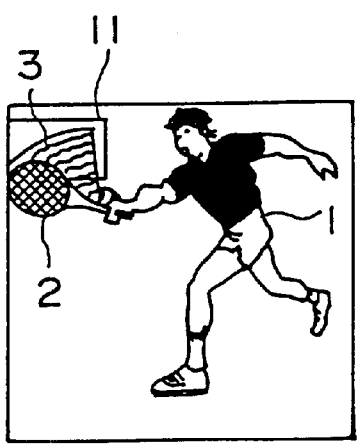
FIG. 4 is a diagram showing an image which includes a vague region.

In this embodiment, each frame of a moving image shown in FIG. 4 is divided into regions having an arbitrary size. Distribution information which indicates a probability of a pixel data being included in a target object is created with respect to each pixel data within each region. For example, the created distribution data is added to a header or the like of each frame of the image data related to the moving image.

Figure 5:
FIG. 5 is a diagram showing distribution information.

In the case of the moving image shown in FIG. 4, a boundary of a racket 2 held by a tennis player 1 is unclear. In this case, because the racket 2 moves at a high speed, it is vague whether a region 3 is the racket 2, the tennis player 1 or a background. This vague region 3 is generated depending on the region of the object which may have an inconsistent shape among the frames, and depending on the shutter speed and focus used at the time of the image pickup, motion of the camera and the object, the state of the background and the like. Hence, the moving image is divided into a plurality of regions 11 having an arbitrary size, and distribution information shown in FIG. 5 is created for each pixel data within the regions 11. This distribution information indicates a probability of the pixel data being included in the target object, that is, the racket 2 in this particular case. In FIG. 5, it is assumed for the sake of convenience that the region 11 is made up of 5×8 pixels, and that the probability of each pixel data being included in the target racket 22 is created with respect to each of the pixels as the distribution information. In FIG. 5, the pixel data value of a blurred portion of the racket 2 is set to 10% or greater, and the pixel data value of a non-blurred portion of the racket 2 is set to 90% or greater. The distribution information is stored in the memory part 202, the disk 110 within the disk drive 203 or a hard disk within the hard disk drive 204, for example. An input moving image data related to the entire moving image shown in FIG. 4 is received via the modem 105 or, read from the memory part 202, the disk 110 within the disk drive 203 or the hard disk within the hard disk drive 204. When extracting the image data of the racket 2 from this input moving image data, the pixel data related to the portion which is to be extracted as the racket 2 can be extracted from the input moving image data by adding the stored distribution information.

Of course, the entire moving image may be divided into the plurality of regions having the arbitrary size, and the distribution information may be created with respect to each of the regions. Alternatively, the distribution information may be created only with respect to each region which includes a vague portion of the moving image.

When a pixel within the region 3 is clicked by the mouse 104 in a state where the moving image shown in FIG. 4 is displayed on the display screen 102 of the display 102, this pixel is recognized as a portion of the moving racket 2 if the distribution information corresponding to the clocked pixel position within the distribution information shown in FIG. 5 is 10% or greater, and is recognized as simply a portion of the racket 2 if the corresponding distribution information is 90% or greater. Accordingly, it possible to discriminate each object within the moving image in steps based on the distribution information, and use the discrimination result to determine a weight of a relationship to another object, a density of the combined image and the like. In addition, in a portion where a plurality of objects overlap, it is possible to dynamically set which object is to be emphasized, by changing a reference value of the distribution information.

Furthermore, when generating a new image by combining the extracted object such as the racket 2 and another image, it is possible to determine a transparency of each pixel based on the distribution information, with respect to unclear and clear boundary portions of the extracted object. As a result, it is possible to generate a natural combined image in which the boundary portion of the extracted object do not appear unnaturally conspicuous.

Figure 6:
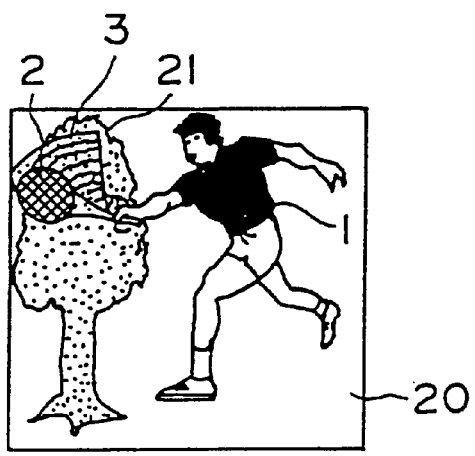
FIG. 6 is a diagram showing a combined image which is obtained in the embodiment by extracting an object within a moving image shown in FIG. 4 and combining the extracted object with an image which is made up of a background and a tree.

FIG. 6 is a diagram showing a combined image which is obtained by extracting the tennis player 1 and the racket 2 within the moving image shown in FIG. 4 and combining the extracted tennis player 1 and the racket 2 to an image which is made up of a background 20 and a tree 21. In this case, a semitransparent process is carried out based on the distribution information shown in FIG. 5 with respect to the pixel data within the region 3. For this reason, the region 3 fits the image shown in FIG. 6, and it is possible to obtain a combined image in which the racket 2 appears as if the racket 2 is moving in front of the tree 21.

Figure 7:
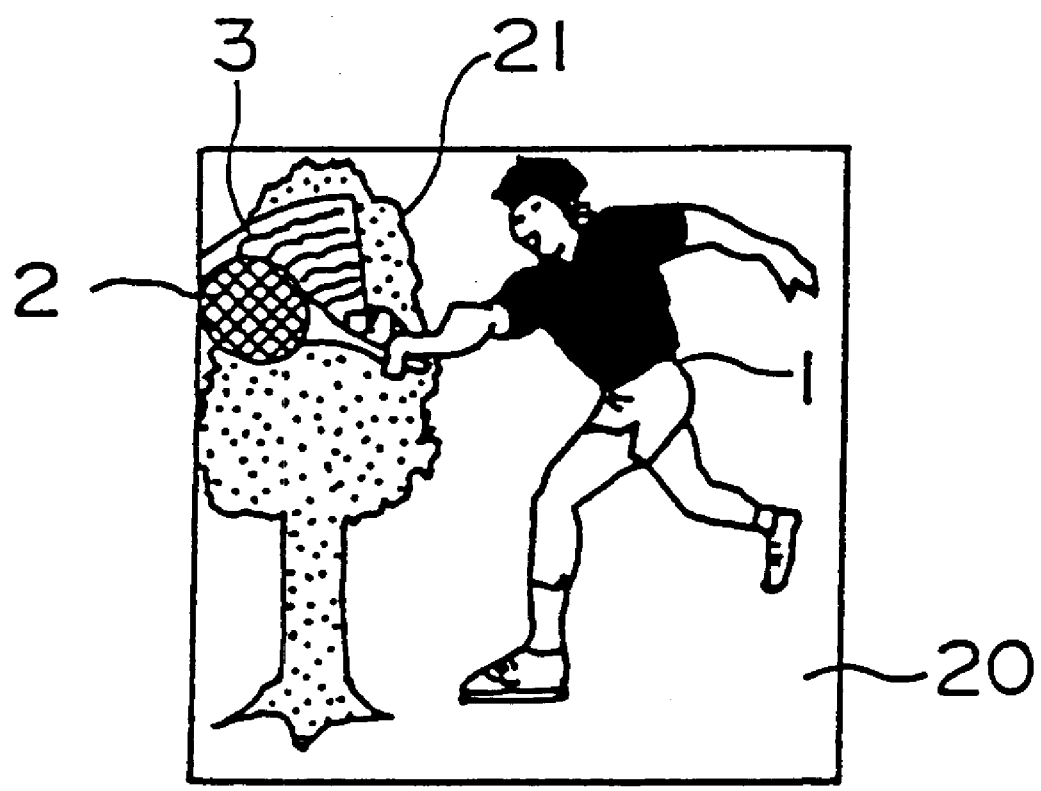
FIG. 7 is a diagram showing a combined image which is obtained by a conventional method by extracting the object within the moving image shown in FIG. 4 and combining the extracted object with the image which is made up of the background and the tree.

On the other hand, if the tennis player 1 and the racket 2 within the moving image shown in FIG. 4 were extracted according to the conventional method and combined with the image which is made up of the background 20 and the tree 21, the combined image would become as shown in FIG. 7. In FIG. 7, those parts which are the same as those corresponding parts in FIG. 6 are designated by the same reference numerals, and a description thereof will be omitted. In this example, the region 3 would also be extracted as the racket 2, and the portion of the racket 2, particularly the region 3, would not fit the image shown in FIG. 7. It may be seen from FIG. 7 that the combined image would become extremely unnatural. On the other hand, if only the racket 2 were extracted and the region 3 were not extracted, the combined image would not be able to describe the motion of the racket, and the combined image would also become extremely unnatural.

Next, a description will be give of the operation of the CPU 201 in this embodiment, by referring to FIGS. 8 through 11.

Figure 8:
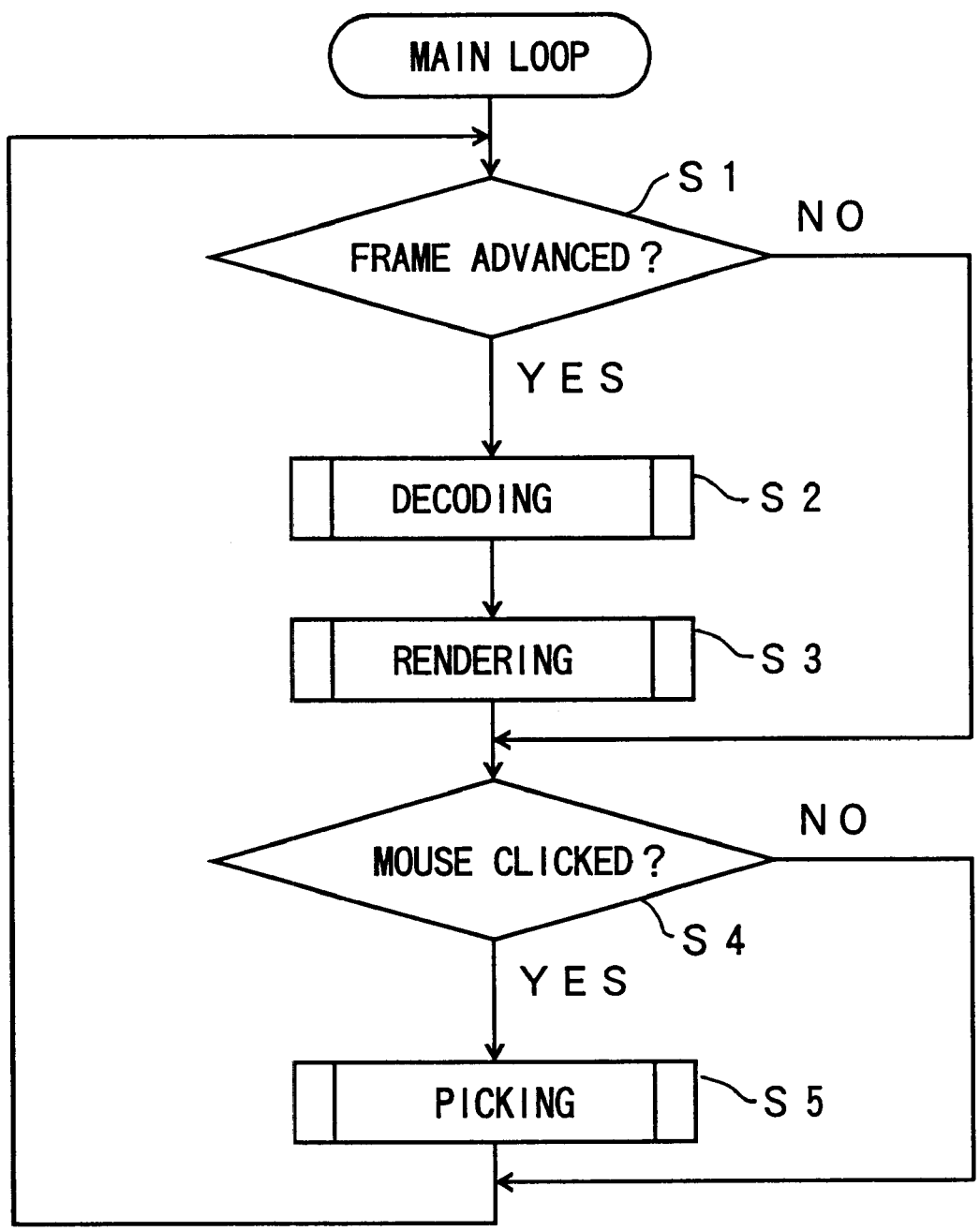
FIG. 8 is a flow chart for explaining a process of a main loop of a CPU.

FIG. 8 is a flow chart for explaining a process of a main loop of the CPU 201. In FIG. 8, a step S1 decides whether or not a frame of an input moving image data has advanced. The input moving image data is received via the modem 105, for example, or is read from the memory part 202, the disk 110 within the disk drive 203 or the hard disk within the hard disk drive 204. If the decision result in the step S1 is NO, the process advances to a step S4 which will be described later. On the other hand, if the decision result in the step S1 is YES, a step S2 carries out a, decoding process which will be described later in conjunction with FIG. 9. In addition, a step S3 carries out a rendering process which will be described later in conjunction with FIG. 10. The step S4 decides whether or not a pixel position on the display screen 102a is specified by the mouse 104, and the process returns to the step S1 if the decision result in the step S4 is NO. On the other hand, if the decision result in the step S4 is YES, a step S5 carries out a picking process which will be described later in conjunction with FIG. 11, and the process returns to the step S1.

Figure 9:
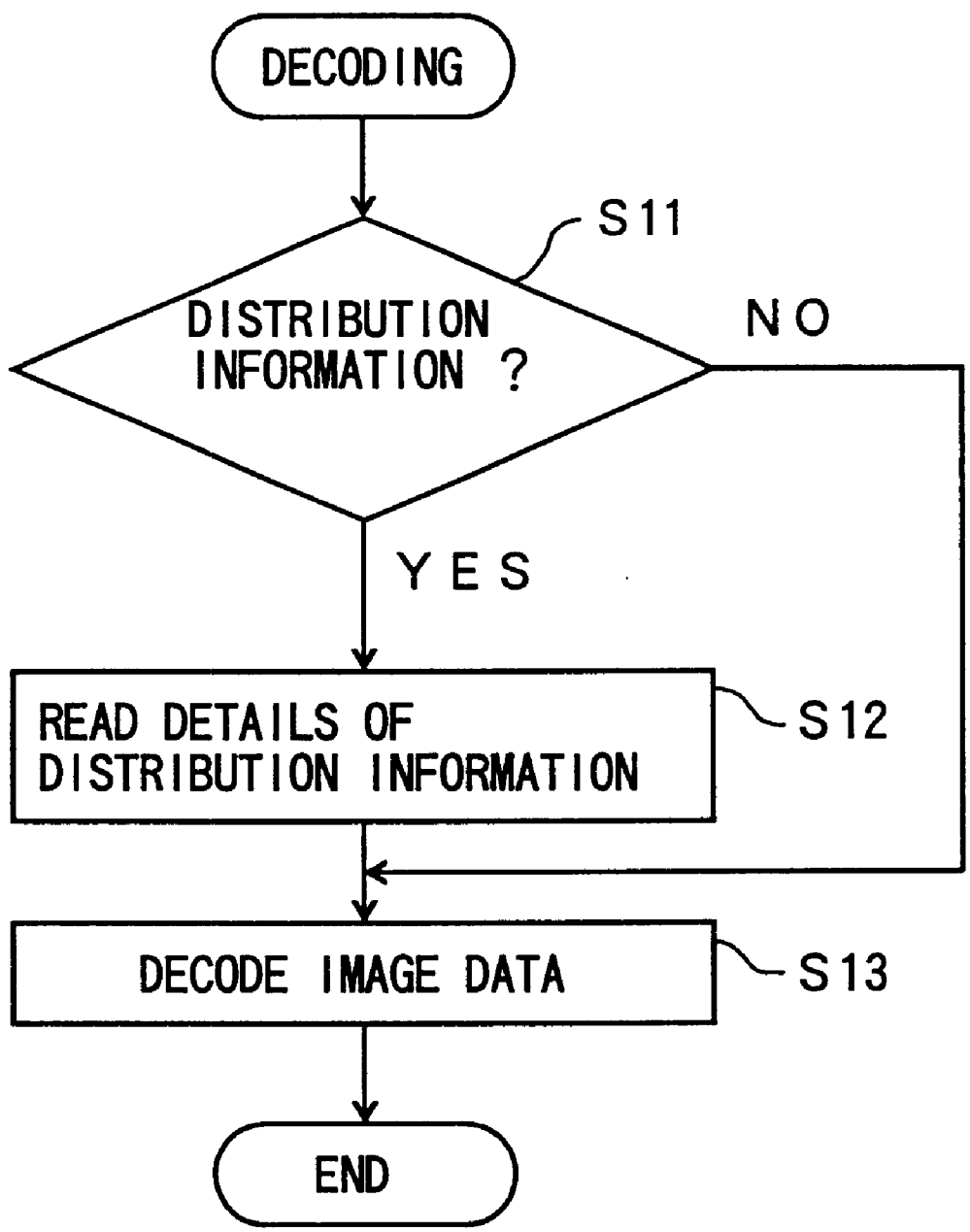
FIG. 9 is a flow chart for explaining a decoding process.

FIG. 9 is a flow chart for explaining the decoding process of the step S2. In FIG. 9, a step S11 decides whether or not the distribution information is added to the input moving image data. If the decision result in the step S11 is NO, the process advances to a step S13 which will be described later. On the other hand, if the decision result in the step S11 is YES, a step S12 reads the details of the distribution information. The step S13 decodes the input moving image data, based on the read distribution information if it exists, so as to generate an image data which is to be displayed on the display screen 102a, and the process ends.

Figure 10:
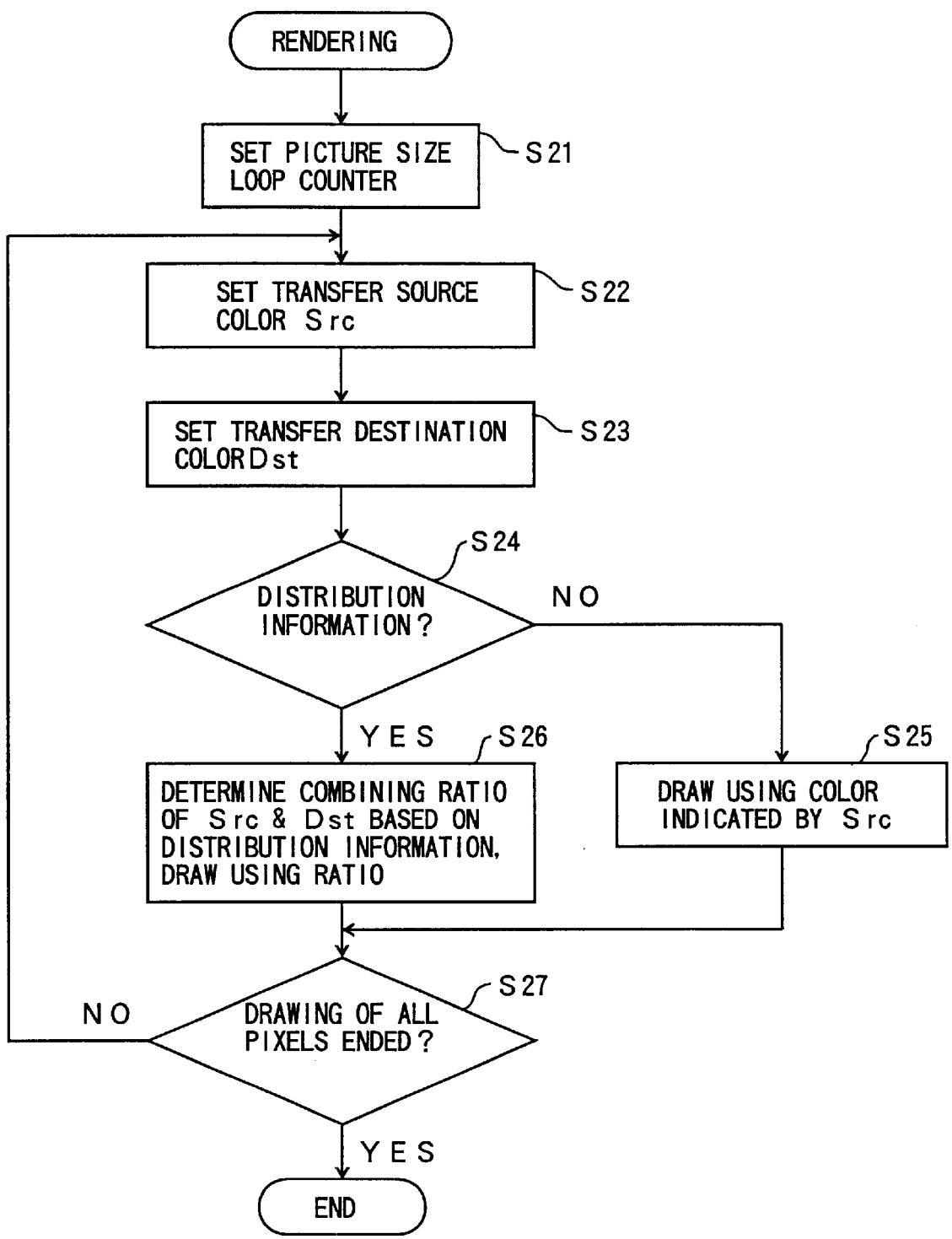
FIG. 10 is a flow chart for explaining a rendering process.

FIG. 10 is a flow chart for explaining the rendering process of the step S3. In FIG. 10, a step S21 sets a picture size loop counter within the CPU 201. A step S22 sets a transfer source color Src, and a step S23 sets a transfer destination color Dst. The transfer source color Src is the information related to the colors of the tennis player 1 and the racket 2 shown in FIG. 4 when extracting the tennis player 1 and the racket 2. In addition, the transfer destination color Dst is the information related to the colors of the background 20 and the tree 21 when combining the extracted tennis player 1 and the racket 2 and the image which is made up of the background 20 and the tree 21 shown in FIG. 6.

If the decision result in a step S24 which decides whether or not the distribution information exists is NO, a step S25 draws the extracted tennis player 1 and the racket 2 using the original transfer source color Src in the combined image, and the process advances to a step S27. On the other hand, if the decision result in the step S24 is YES, a step S26 determines a combining ratio of the transfer source color Src and the transfer destination color Dst, draws the extracted tennis player 1 and the racket 2 using the determined combining ratio in the combined image, and the process advances to the step S27. The step S27 decides whether or not the drawing of all of the pixels of the combined image has been made. The process returns to the step S22 if the decision result in the step S27 is NO, and the process ends if the decision result in the step S27 is YES.

Figure 11:
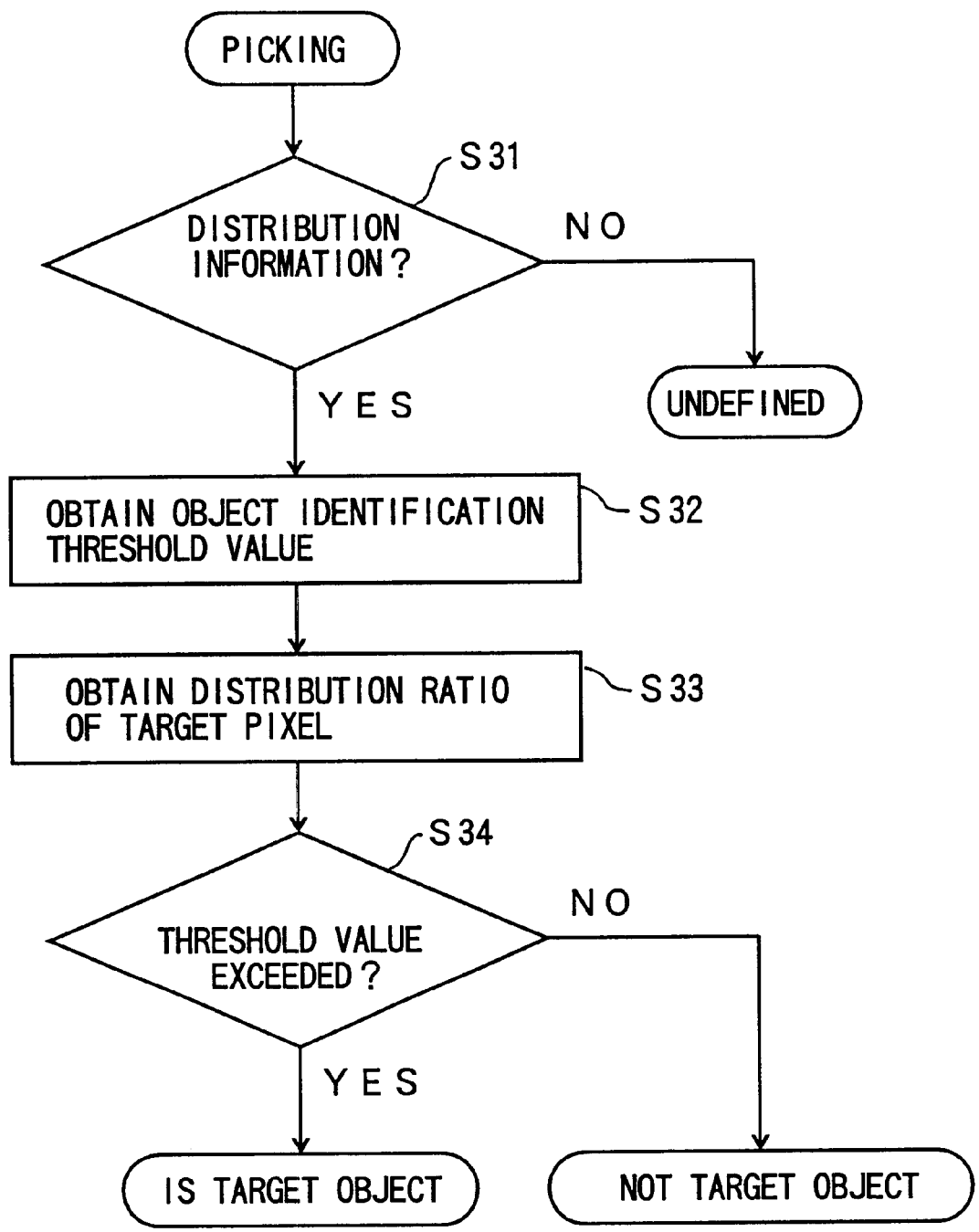
FIG. 11 is a flow chart for explaining a picking process.

FIG. 11 is a flow chart for explaining the picking process of the step S5. In FIG. 11, a step S31 decides whether or not the distribution information is added to the input moving image data. If the decision result in the step S31 is NO, the image data processing of this embodiment which uses the distribution information is not carried out. On the other hand, if the decision result in the step S31 is YES, a step S32 obtains an object identification threshold value. In the case explained above in conjunction with FIGS. 4 and 5, the object identification threshold value with respect to the racket 2 is 10%. A step S33 obtains a distribution rate of a target pixel which is specified by the mouse 104. A step S34 decides whether or not the distribution rate of the target pixel obtained in the step S33 exceeds the object identification threshold value. If the decision result in the step S33 is YES, it is judged that the target pixel is a part of the object, that is, a part of the racket 2. On the other hand, if the decision result in the step S33 is NO, it is judged that the target pixel is not a part of the object, that is, not a part of the racket 2.

Figure 12:
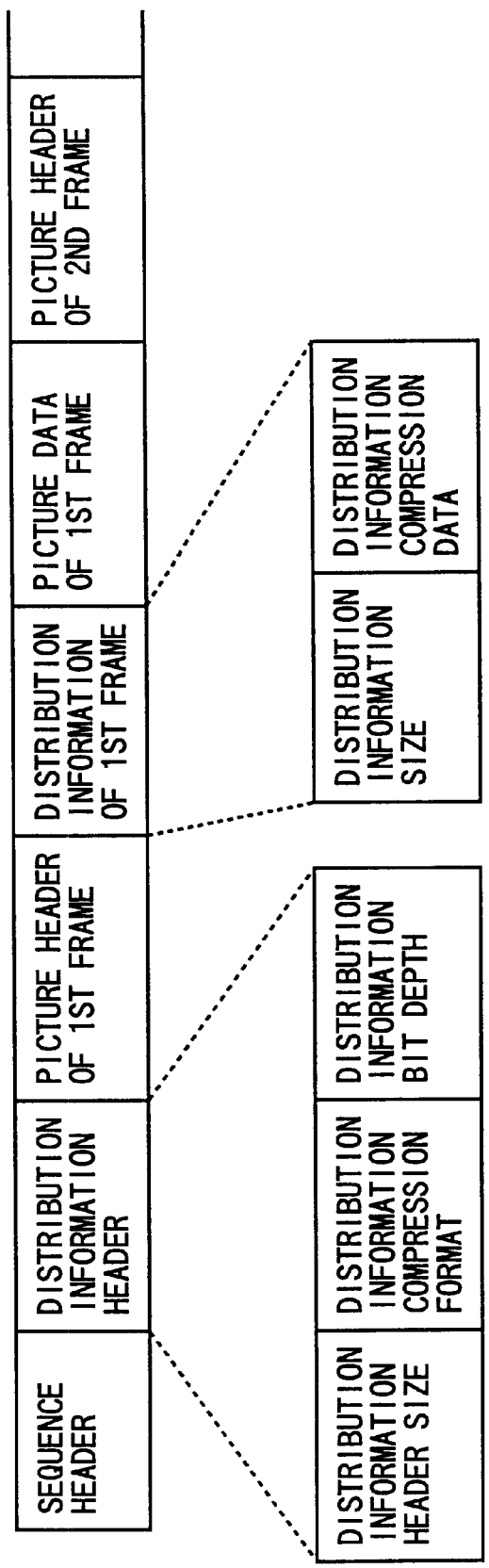
FIG. 12 is a diagram for explaining an addition of the distribution information when an image data is made up of a MPEG1 video stream.

The method of adding the distribution information to the image data is not limited to a specific method. In a case where the image data is made up of a MPEG1 video stream, the distribution information can be added as shown in FIG. 12. In FIG. 12, the MPEG1 video stream includes a sequence header, a distribution information header, a picture header of a first frame, distribution information of the first frame, picture data of the first frame, picture data of a second frame and the like. In this case, the distribution information header includes a distribution information header size, a distribution information compression format, and a distribution information bit depth. In addition, the distribution information of the first frame includes a distribution information size and a distribution information compression data. An extending data indicating a storage format of the distribution information is added to a user data extending portion or the like of the sequence header in this manner, and the distribution information of each frame is added to the extending portion of the corresponding picture data. The bit depth of the distribution information may be changed depending on the usage, and is stored after being subjected to a compression process using a run length or the like.

In the embodiment described above, the image data processing is carried out with respect to the moving image. However, it is of course possible to similarly apply the present invention to the image data processing with respect to a still image, because the boundary of the object within the still image may not always be clear, depending on the shutter speed and focus used at the time of the image pickup, motion of the camera and the object, the state of the background and the like.

Therefore, according to the present invention, it is possible to satisfactorily extract the object from the image even if the boundary portion of the object within, the image is vague, and it is also possible to combine the extracted object with another image without deteriorating the picture quality of the combined image.

Further, the present invention is not limited to these embodiments, but various variations and modifications may be made without departing from the scope of the present invention.

What is claimed is:

1. An image data processing method comprising:
   storing an image data which includes a first image data related to a first object and a second image data related to a background or a second object which is different from the first object;
   storing distribution information which indicates a probability that each pixel data is included in the first image data, with respect to at least one portion of the first image data; and
   adding the distribution information to the first image data when extracting the first image data from the image data.

2. The image data processing method as claimed in claim 1, wherein said at least one portion of the first image data includes a boundary region of the first object.

3. The image data processing method as claimed in claim 1, further comprising:
   combining the first image data which is extracted from the image data and is added with the distribution information and a third image data which is related to an arbitrary image, by carrying out a semitransparent process with respect to said at least one portion of the first image data based on the distribution information.

4. The image data processing method as claimed in claim 1, wherein the image data is related to a moving image.

5. An image data processing apparatus comprising:
   a first storage storing an image data which includes a first image data related to a first object and a second image data related to a background or a second object which is different from the first object;
   a second storage storing distribution information which indicates a probability that each pixel data is included in the first image data, with respect to at least one portion of the first image data; and
   distribution information adding means for adding the distribution information to the first image data when extracting the first image data from the image data.

6. The image data processing apparatus as claimed in claim 5, wherein said at least one portion of the first image data includes a boundary region of the first object.

7. The image data processing apparatus as claimed in claim 5, further comprising:
   a combining part combining the first image data which is extracted from the image data and is added with the distribution information and a third image data which is related to an arbitrary image by carrying out a semi-transparent process with respect to said at least one portion of the first image data based on the distribution information.

8. The image data processing apparatus as claimed in claim 5, wherein the image data is related to a moving image.

9. A computer-readable storage medium which stores a program for causing a computer to extract a portion of an image, comprising:
   means for causing the computer to store an image data which includes a first image data related to a first object and a second image data related to a background or a second object which is different from the first object;
   means for causing the computer to store distribution information which indicates a probability that each pixel data is included in the first image data, with respect to at least one portion of the first image data; and
   means for causing the computer to add the distribution information to the first image data when extracting the first image data from the image data.

10. The computer-readable storage medium as claimed in claim 9, wherein said at least one portion of the first image data includes a boundary region of the first object.

11. The computer-readable storage medium as claimed in claim 9, further comprising:
    means for causing the computer to combine the first image data which extracted from the image data and is added with the distribution information and a third image data which is related to an arbitrary image, by carrying out a semitransparent process with respect to said at least one portion of the first image data based on the distribution information.

12. The computer-readable storage medium as claimed in claim 9, wherein the image data is related to a moving image.

13. The image data processing method as claimed in claim 2, further comprising:
    combining the first image data which is extracted from the image data and is added with the distribution information and a third image data which is related to an arbitrary image, by carrying out a semitransparent process with respect to said at least one portion of the first image data based on the distribution information.

14. The image data processing method as claimed in claim 2, wherein the image data is related to a moving image.

15. The image data processing method as claimed in claim 3, wherein the image data is related to a moving image.

16. The image data processing apparatus as claimed in claim 6, further comprising:
    a combining part combining the first image data which is extracted from the image data and is added with the distribution information and a third image data which is related to an arbitrary image by carrying out a semi-transparent process with respect to said at least one portion of the first image data based on the distribution information.

17. The image data processing apparatus as claimed in claim 6, wherein the image data is related to a moving image.

18. The image data processing apparatus as claimed in claim 7, wherein the image data is related to a moving image.

19. The computer-readable storage medium as claimed in claim 10, further comprising:
    means for causing the computer to combine the first image data which extracted from the image data and is added with the distribution information and a third image data which is related to an arbitrary image, by carrying out a semitransparent process with respect to said at least one portion of the first image data based on the distribution information.

20. The computer-readable storage medium as claimed in claim 10, wherein the image data is related to a moving image.

21. The computer-readable storage medium as claimed in claim 11, wherein the image data is related to a moving image.

22. An image data processing method comprising:
    storing an image data which includes a first image data related to a first object and a second image data related to a background or a second object which is different from the first object;
    storing distribution information which indicates a probability of each pixel data being included in the first image data, with respect to at least one portion of the first image data;
    adding the distribution information when extracting the first image data from the image data; and
    combining the first image data which is extracted from the image data and is added with the distribution information and a third image data which is related to an arbitrary image, by carrying out a semitransparent process with respect to said at least one portion of the first image data based on the distribution information.

23. An image data processing apparatus comprising:
    a first storage storing an image data which includes a first image data related to a first object and a second image data related to a background or a second object which is different from the first object;
    a second storage storing distribution information which indicates a probability of each pixel data being included in the first image data, with respect to at least one portion of the first image data;
    distribution information adding means for adding the distribution information when extracting the first image data from the image data; and
    a combining part combining the first image data which is extracted from the image data and is added with the distribution information and a third image data which is related to an arbitrary image by carrying out a semi-transparent process with respect to said at least one portion of the first image data based on the distribution information.

24. A computer-readable storage medium which stores a program for causing a computer to extract a portion of an image, comprising:
    means for causing the computer to store an image data which includes a first image data related to a first object and a second image data related to a background or a second object which is different from the first object;
    means for causing the computer to store distribution information which indicates a probability of each pixel data being included in the first image data, with respect to at least one portion of the first image data;

means for causing the computer to add the distribution information when extracting the first image data from the image data; and means for causing the computer to combine the first image data which extracted from the image data and is added with the distribution information and a third image data which is related to an arbitrary image, by carrying out a semitransparent process with respect to said at least one portion of the first image data based on the distribution information.

25. An image data processing method comprising:

storing an image data which includes a first image data related to a first object and a second image data related to a background or a second object which is different from the first object;

storing distribution information which indicates a probability of each pixel data being included in the first image data, with respect to at least one portion of the first image data, wherein said at least one portion of the first image data includes a boundary region of the first object;

adding the distribution information when extracting the first image data from the image data; and combining the first image data which is extracted from the image data and is added with the distribution information and a third image data which is related to an arbitrary image, by carrying out a semitransparent process with respect to said at least one portion of the first image data based on the distribution information.

26. An image data processing apparatus comprising:

a first storage storing an image data which includes a first image data related to a first object and a second image data related to a background or a second object which is different from the first object;

a second storage storing distribution information which indicates a probability of each pixel data being included in the first image data, with respect to at least one portion of the first image data, wherein said at least one portion of the first image data includes a boundary region of the first object;

distribution information adding means for adding the distribution information when extracting the first image data from the image data; and a combining part combining the first image data which is extracted from the image data and is added with the distribution information and a third image data which is related to an arbitrary image by carrying out a semitransparent process with respect to said at least one portion of the first image data based on the distribution information.

27. A computer-readable storage medium which stores a program for causing a computer to extract a portion of an image, comprising:

means for causing the computer to store an image data which includes a first image data related to a first object and a second image data related to a background or a second object which is different from the first object;

means for causing the computer to store distribution information which indicates a probability of each pixel data being included in the first image data, with respect to at least one portion of the first image data, wherein said at least one portion of the first image data includes a boundary region of the first object;

means for causing the computer to add the distribution information when extracting the first image data from the image data; and means for causing the computer to combine the first image data which extracted from the image data and is added with the distribution information and a third image data which is related to an arbitrary image, by carrying out a semitransparent process with respect to said at least one portion of the first image data based on the distribution information.

* * * * *